United States Patent
Wolkowicz et al.

(10) Patent No.: US 11,270,155 B2
(45) Date of Patent: Mar. 8, 2022

(54) DUPLICATE IMAGE DETECTION BASED ON IMAGE CONTENT

(71) Applicant: Dash Hudson, Halifax (CA)

(72) Inventors: Jacek Wolkowicz, Halifax (CA); Tomasz Niewiarowski, Halifax (CA)

(73) Assignee: DASH HUDSON, Halifax (CA)

( * ) Notice: Subject to any disclaimer, the term of this patent is extended or adjusted under 35 U.S.C. 154(b) by 148 days.

(21) Appl. No.: 16/696,256

(22) Filed: Nov. 26, 2019

(65) Prior Publication Data

US 2021/0158082 A1    May 27, 2021

(51) Int. Cl.
  *G06K 9/62*    (2006.01)
(52) U.S. Cl.
  CPC ......... *G06K 9/6215* (2013.01); *G06K 9/6212* (2013.01)
(58) Field of Classification Search
  USPC .................................................. 382/190, 305
  See application file for complete search history.

(56) References Cited

U.S. PATENT DOCUMENTS

| | | | | |
|---|---|---|---|---|
| 6,961,463 | B1* | 11/2005 | Loui | G06T 7/20 382/170 |
| 7,647,331 | B2* | 1/2010 | Li | G06F 16/951 382/218 |
| 8,340,451 | B2* | 12/2012 | Noguchi | G06F 16/583 382/253 |
| 9,009,149 | B2* | 4/2015 | He | G06F 16/24578 707/728 |
| 9,373,029 | B2* | 6/2016 | Hull | G06K 9/00449 |
| 10,025,950 | B1* | 7/2018 | Avasarala | G06K 9/6223 |
| 10,769,503 | B1* | 9/2020 | Buhler | H04N 1/00082 |
| 2007/0239756 | A1* | 10/2007 | Li | G06F 16/951 |
| 2009/0324077 | A1* | 12/2009 | Wu | H04N 21/44008 382/170 |
| 2011/0317923 | A1* | 12/2011 | Hondo | G06F 16/335 382/190 |
| 2021/0157833 | A1* | 5/2021 | Wolkowicz | G06F 16/532 |

OTHER PUBLICATIONS

Shi et al., A Coarse to fine Method for Near-duplicate Image Retrieval with Matching Probability Model. 2017, IEEE 978-1-5386-2280-3/17, pp. 185-190. (Year: 2017).*

Ling et al., Efficient Image Copy Detection Using Multi-scale Fingerprints, 2012, IEEE 1070-986X/12, pp. 61-69. (Year: 2012).*

* cited by examiner

*Primary Examiner* — Ishrat I Sherali
(74) *Attorney, Agent, or Firm* — Polsinelli PC

(57) ABSTRACT

The present technology can analyze a collection of images to generate a high-dimension first representation of each image in the collection of images, and then reduce the dimensionality of the high-dimension first representation of each image by identifying significant features from the high-dimension first representation to yield a reduced-dimension second representation for each image in the collection of images. The present technology can then compare the second representation of any image in the collection of images to the second representation of any other image in the collection of images, wherein images having identical second representation are duplicates.

14 Claims, 4 Drawing Sheets

DUPLICATE IMAGE DETECTION BASED ON IMAGE CONTENT

TECHNICAL FIELD

The present technology pertains to duplicate image detection, and more specifically pertains to detecting images having duplicate content, even when the data making up the file are different.

BACKGROUND

Most technologies that attempt to perform detection of duplicate images generally use Metadata associated with the images to identify duplicates, or direct comparison of file content with heavy image processing to remove all potential differences and representing images in low dimensional spaces as "hashes" directly from image content. But these approaches are not tailored to the modern internet image content that are being generated at a faster pace than ever. Moreover, current products fail to recognize that a manipulated image with the same content is a duplicate of the original image.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
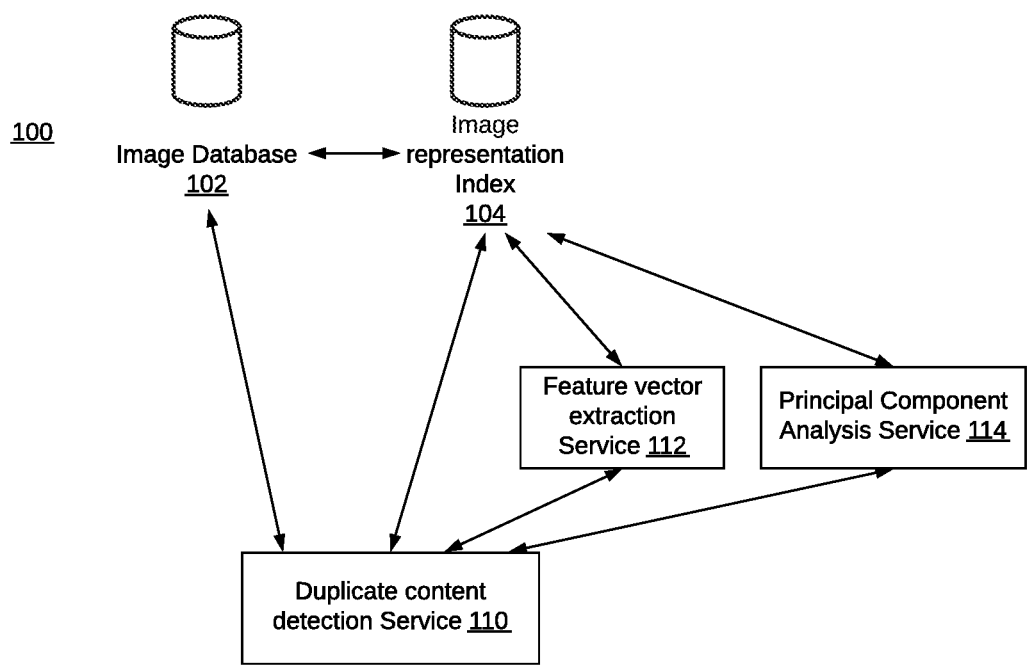
FIG. 1 illustrates an example system for duplicate image detection based on image content in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present technology addresses a need in the art for improved techniques for duplicate image detection. Machine detection of duplicate images is a tough technical challenge owing in part to the fact that the same image content might be reflected in files with very different data. Two images files having the same content might have different data because each of two files are in different file formats, or have different resolutions. Additionally, what a human might perceive to be the same content might be perceived differently by a machine. For example, the same image at the same resolution and in two different files of the same format might still look like different files to a machine if one of the images has been manipulated with a filter or other post production treatment. While a human recognizes these images as having the same content, but with different color tones, brightness, etc., a computer might recognize these are being completely different.

Comparing file metadata is also not sufficient. While some file metadata can translate between different file formats, not all metadata survives jumps in format type. Also, when a file is created with different post production treatments, these files might be created as new files without the metadata of the original file.

Some image search engine technologies might analyze the actual content of an image with a classifier to identify some recognized object in the image (e.g., a cat is in the picture) and find other pictures having the recognized object, but such technologies are not generally sufficient to determine whether one picture having the recognized object is a duplicate of another picture having the recognized object.

Accordingly, there needs to be a mechanism for a computer to analyze the content of an image and compare it to the content of another image. At the same time, such a technology needs to be efficient enough to review a quantity of images for duplicates in a reasonable time frame.

The present technology addresses the above needs in the art by analyzing the content of images to create complex representations of the images and then reducing the complexity of these representations into a size that is both suitable for comparison but also contains critical image descriptive aspects. These reduced complexity representations can then be used to efficiently compare images and identify duplicate images based on their content.

Specifically, the disclosed technology can analyze a collection of images to generate a high-dimension first representation of each image in the collection of images, and then reduce the dimensionality of the high-dimension first representation of each image by identifying significant features from the high-dimension first representation to yield a reduced-dimension second representation for each image in the collection of images. The present technology can then compare the second representation of any image in the collection of images to the second representation of any other image in the collection of images, wherein images having the substantially similar second representation are duplicates.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As used herein the term "duplicate" shall be used to refer to a visually identical image, or an image that has been manipulated such as resizing, cropping, changing resolution, color space morphing, applying filters, or manipulated via post processing techniques. The manipulated image and the original image retain the same image content, but a different appearance. These duplicates can have the same image content but different file data. The proper understanding of the term will be apparent to persons of ordinary skill in the art in the context in which the term is used.

FIG. 1 illustrates an example system 100 for duplicate image detection based on image content. The system 100 includes image database 102 that is configured to store image files, where at least some of the image files include the same image content as other images. The images can be collected directly from digital cameras (including smartphones) or scanners, or can be harvested from Internet websites such as social media websites like INSTAGRAM and FACEBOOK.

Digital cameras and Internet websites commonly provide image post processing software that can manipulate the aspects of the image that was actually received from a light detector of a camera. These manipulations can create other versions of the same image wherein each version is a duplicate of the contents of the other versions.

FIG. 1 also illustrates image representation index 104. Image representation index 104 is configured to store one or more representations (alpha numeric strings, vectors, etc.) that are descriptive of the images in image database 102. Image representation index 104 can also include a reference or pointer to an image in image database 102.

In some embodiments, image database 102 and image representation index 104 can be the same database. In some embodiments, image database 102 and image representation index 104 can be stored on the same physical or virtual disk.

System 100 also includes duplicate content detection service 110, which is configured to process images in image database into one or more representations and to compare representations to detect files having duplicate image content. In some embodiments, duplicate content can coordinate with feature vector extraction service 112, and Principal Component Analysis service 114 to generate the one or more representations.

Feature vector extraction service 112 can be any tool configured to analyze image content of an image file and output an alphanumeric representation or feature vector representation of the content of the image file. A suitable technique can be employed by some image analysis artificial intelligence platforms. For example convolutional neural networks can be trained to analyze image content and output representations that can be input into classifiers to identify objects in images. In such a system the output of the convolutional neural network can be a high-dimensional representation of the content of the image.

An example of a feature vector extraction service is GOOGLE INCEPTION deep neural network. In some embodiments, the feature vector is received from the feature vector extraction service 112. In some embodiments, the feature vector might not be the final output of the feature vector extraction service and instead the feature vector might be an intermediate representation of the image that feature vector extraction service 112 might use for some other purpose.

In some embodiments the feature vector received from feature vector extraction service 112 is a high dimensional representation of the content of an image. Such high dimensional representation can include over 2048 bits of data and as such might be too large to provide direct comparisons between images. In such embodiments, it can be useful to perform a principal component analysis (PCA) on the high dimensional representation to determine which dimensions of the high dimensional representation are the most important in comparing image content to other images.

Principal component analysis service 114 can be used to perform the principal component analysis on the high dimensional feature vectors. An output of the principal component analysis can be a scoring of how important a dimension of the high dimensional representation is in comparing content of images. The dimensions having the highest absolute value scores (the most important) can be selected, and these dimensions can be used to create a reduced dimensionality representation of the images.

Principal component analysis service 114 and its functions are addressed in greater detail with respect to FIG. 3, below.

As noted above, duplicate content detection service 110 can compare the reduced dimensionality representation of the images. Any images having the same or nearly the same reduced dimensionality representations can be considered duplicates.

Figure 2:
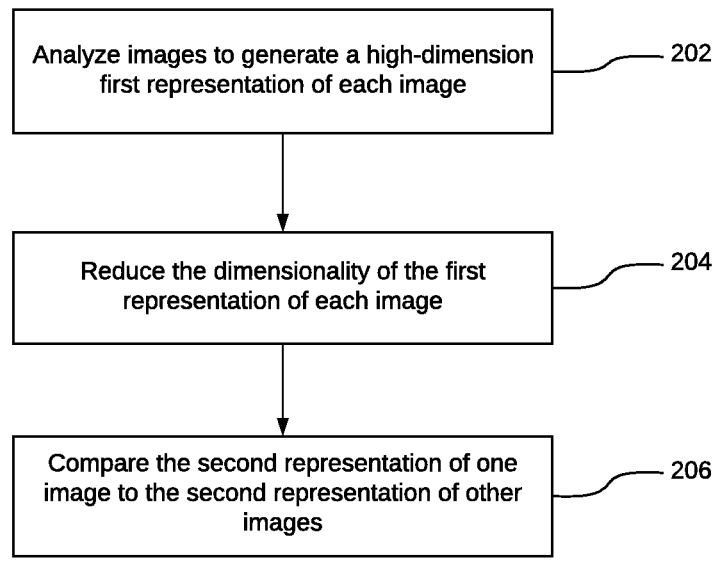
FIG. 2 illustrates an example method of searching for duplicate images in a database based on a reduced-dimension representation of the images in accordance with some aspects of the present technology.

Further details pertaining to the components of system 100 will be addressed below. FIG. 2 and FIG. 3 will be addressed with reference to FIG. 1. While these figures may be discussed with reference to each other, such references should not be considered limiting of the present technology.

FIG. 2 illustrates an example method 200 of identifying duplicate images in a database based on the reduced-dimension representation of the images. Duplicate detection content service 110 can obtain high-dimension first representations for a collection of images in image database 102 by analyzing (202) the images using feature vector extraction service 112. In some examples, a neural network service trained to provide the high-dimension first representation descriptive of image content can be used. One example is GOOGLE'S INCEPTION deep neural network. This process of generating high-dimension first representation of each image includes, but is not limited to, extracting about 2048 bits of content based feature vectors from each image in the collection of images.

As addressed above the 2048 bit representation can be highly descriptive of the image, but much of the description is too specific for the present analysis. Additionally, comparisons of 2048 bit representations can be computationally intensive. Accordingly, duplicate detection content service 110 can reduce (204) the dimensionality of the first representation of each image.

In some embodiments, Principal Component Analysis service 114 can be used to reduce the dimensionality of the high-dimension first representation of each image by identifying significant content based features from the high-dimension first representation to yield a reduced-dimension second representation for each image in the collection of images (204). In some embodiments, reducing the dimensionality includes, but is not limited to performing a Principal Component Analysis (PCA) on the high-dimension first representation for each image to receive a score of the significance of each of the high-dimension first representation for each image in determining duplicate content in the images. In some examples, such a Principal Component Analysis (PCA) is performed on the about 2048 bits of feature vectors output from the feature vector extraction service 112, to receive a score of the significance of each of the about 2048 feature vectors. Duplicate detection content service 110 can receive the output of the Principal Component Analysis and determine the bits having the highest absolute score (scores are given in positive and negative values) which indicate their relative significance in making the duplicate content determination. The bits having the highest absolute score can be retained by duplicate detection content service 110 and the rest discarded, thereby, duplicate detection content service 110 can truncate (204) an output high-dimension first representation from the Principal Component Analysis to yield the reduced-dimension second representation for each image in the collection of images.

Duplicate content detection service 110 identifies duplicate images by comparing the second representation of any image in the collection of images to the second representation of any other image in the collection of images (206). Specifically, duplicate content detection service 110 searches for images that have the same or substantially the same second representations and identifies them as duplicates of each other. Because the second representation is based on features that are the most representative of the content of the images, the identified duplicates are substantially identical in content, regardless of the post production manipulation to the images. For example, the identified duplicates can be a version of the original image that has been manipulated such as resizing, cropping, changing resolution, color space morphing, applying filters, or manipulated via other means from the original image.

The above method may not limited in searching for duplicate images in an image database, it might also be used to search for duplicate images in videos or GIF images.

Figure 3:
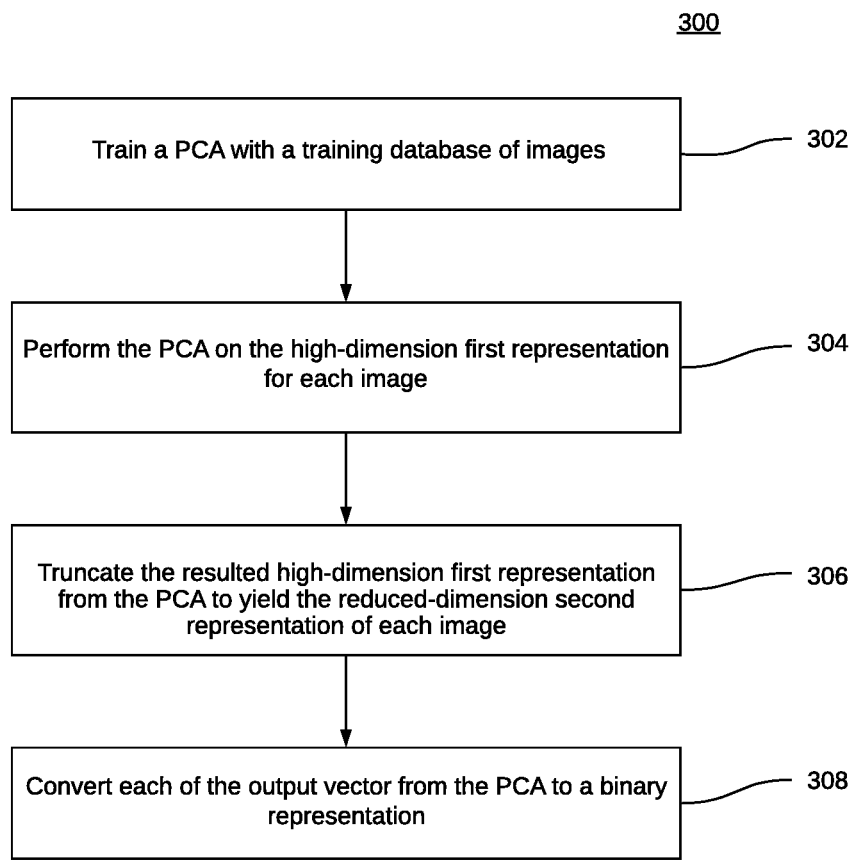
FIG. 3 illustrates an example method of reducing the dimensionality of a high-dimension first representation of each image in accordance with some aspects of the present technology.

FIG. 3 illustrates an example method 300 of reducing the dimensionality of the high-dimension first representation of each image. This is done by identifying significant features from the high-dimension first representation to yield a reduced-dimension second representation for each image in a collection of images. Specifically, the duplicate content detection service 110 trains a Principal Component Analysis (PCA) with a training database of images of specific categories (302), such as beauty, cosmetics, and lifestyle digital images. The training helps the model to adapt to the specific training categories of images within which the search of duplicate images is conducted. In an example training database of beauty, cosmetics, and lifestyle digital images, the training database contains at least millions of images. After the training, the Principal Component Analysis (PCA) will be able to identify the significant features from the high-dimension first representation, in the specific training image categories. Moreover, the Principal Component Analysis (PCA) will be able to rank the dimensionality of the first representation based on the significance of each of the dimensionality of the first representation in detecting duplicates. One example of the Principal Component Analysis (PCA) is Matrix Factorization using Singular Value Decomposition to extract the main trends in the high-dimension first representation.

The Principal Component Analysis service 114 performs the trained Principal Component Analysis (PCA) on the high-dimension first representation for each image (304). The high-dimension first representation can be different types of feature vectors of each image. In one example, the high-dimension first representation for each image includes 2048 bits of feature vectors. The resulted 2048 bits of feature vectors for each image will be ranked from the most significant to the least significant. In some examples, the trained Principal Component Analysis (PCA) can be performed unsupervised.

The Principal Component Analysis service 114 also truncate the resulted high-dimension first representation output from the Principal Component Analysis (PCA) to yield the reduced-dimension second representation for each image in the collection of images (306). The truncating can be performed as part of the Principal Component Analysis (PCA) or after the completion of the Principal Component Analysis (PCA). The length of the resulted reduced-dimension second representation retained from truncating the resulted high-dimension first representation for the final identification of duplicate images depends on the training process of the Principal Component Analysis (PCA), and the categories of images used to train the Principal Component Analysis (PCA). In an example using training database of beauty, cosmetics, and lifestyle digital images, the duplicate content detection service 110 will control the Principal Component Analysis service 114 to retain a reduced number of about the first 20-50 bits from the output 2048 bits of feature vectors from the Principal Component Analysis (PCA), as the reduced-dimension second representation. In one example, the duplicate content detection service 110 will control the Principal Component Analysis service 114 to retain at least the first 20 bits from the output feature vectors from the Principal Component Analysis as the reduced-dimension second representation. In another example, the duplicate content detection service 110 will control the Principal Component Analysis service 114 to retain at least the first 32 bits from the output feature vectors from the Principal Component Analysis as the reduced-dimension second representation. In yet another example, the duplicate content detection service 110 will control the Principal Component Analysis service 114 to retain at least the first 44 bits from the output feature vectors from the Principal Component Analysis as the reduced-dimension second representation. This truncating is to reduce the dimensionalities of the image representations to a small enough size to save the processing computational resources, but primarily to maintain generalization ability of the system when comparing the representations of each image, while still maintaining a high accuracy of identifying the duplicate images.

The duplicate content detection service 110 then converts each of the reduced-dimension second representation output from the Principal Component Analysis (PCA) to a binary representation (308). In an example using training database of beauty, cosmetics, and lifestyle digital images, the duplicate content detection service 110 converts each of the output feature vectors from the Principal Component Analysis (PCA) to a binary representation. First, based on a set threshold of value for all the feature vectors, each of the feature vectors would be transformed into either a positive number or a negative number. Such a threshold could be set manually or automatically depends on the training database used. Any feature vector with a positive value in the output feature vectors from the Principal Component Analysis (PCA) is represented as a one, and any feature vector with a negative value in the output feature vectors from the Principal Component Analysis (PCA) is represented as a zero. This conversion is to further reduce the size of the image representations to save the processing computational resources, and primarily to maintain generalization ability of the system when comparing the representations of each image, while still maintaining a high accuracy of identifying the duplicate images.

Referring back to FIG. 2, after the above processes (300), the duplicate content detection service 110 can identify the duplicate images by comparing the second reduced-dimension binary representation of any image in the collection of images to the second reduced-dimension binary representation of any other image in the collection of images (206). In an example using training database of beauty, cosmetics, and lifestyle digital images, the duplicate content detection service 110 will search for images that have the exact same binary values for all of the reduced number of the output feature vectors, such as images that have the exact same binary values for the first 32 bits of the output feature vectors. In some embodiments, an additional standard similarity based comparison metric can be performed after the duplicates detection process (300). This additional comparison metric is to finalize the duplicate detection results by eliminating a few distinct yet very similar images that share the same second reduced-dimension binary representation.

This technology can be utilized along with text based image searches and image engagement prediction of image on social media. In one example, this technology can be performed either before or after a text based image search, to help grouping and removing the duplicates. In another example, the ability to group duplicate images together will help the system to better predict the engagement prediction of image on social media.

This technology provides the following improvements in duplicate image detection. First, the system can better detect duplicates that have been manipulated, such as resizing, cropping, changing resolution, color space morphing, applying filters, or manipulated via other means. Because by reducing the dimensionality of the representations of each image, the system will strip the trivial differences between duplicates attributable to manipulation.

Second, the system can detect duplicate images in a larger scale of database faster. Because by using such a reduced representation reduces the computational complexity of comparing each duplicate image from exponential to linear. Thus, this technology can be utilized in a global internet scale.

Third, this technology also provides a much better user experience, because it solves the common confusing issues of current products, such as the failure to identify visually identical image or images with the same image content just because they have different file data, or the failure to eliminate visually different image or images with different image content just because they have the same file data.

One or more systems, processes, and/or methods of this technology may utilize one or more machine learning systems, processes, and/or methods to help achieve the duplicate image detection. For example, the one or more machine learning systems, processes, and/or methods may be used to train the Principal Component Analysis (PCA) model described before.

Figure 4:
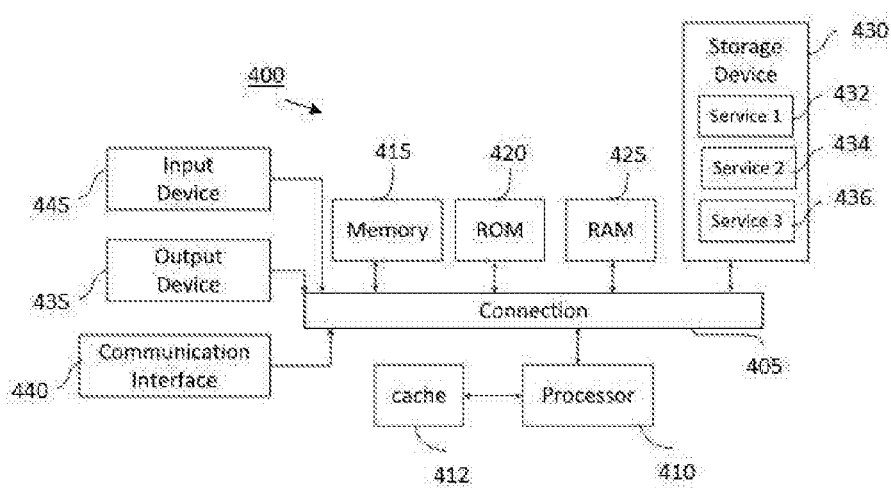
FIG. 4 illustrates an example of computing system in accordance with some aspects of the present technology.

FIG. 4 shows an example of computing system 400, which can be for example system 100, any computing device making up system 100, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) 420 and random access memory (RAM) 425 to processor 410. Computing system 400 can include a cache of high-speed memory 412 connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions stored thereon, the instructions being effective to cause at least one processor to:
    analyze a collection of images to generate a high-dimension first representation of each image in the collection of images;
    reduce the dimensionality of the high-dimension first representation of each image by:
        identifying significant features from the high-dimension first representation,
        performing a Principal Component Analysis on the high-dimension first representation for each image;
        truncating an output from the Principal Component Analysis;
        converting the output from the Principal Component Analysis to a binary representation to yield a reduced-dimension second representation, wherein any positive value in the output from the Principal Component Analysis is represented as a one and any negative value in the output from the Principal Component Analysis is represented as a zero; and
    compare the reduced-dimension second representation of any image in the collection of images to the reduced-dimension second representation of any other image in the collection of images, wherein images having identical second representations are duplicates.

2. The non-transitory computer readable medium of claim 1, wherein the analysis of the collection of images to generate a high-dimension first representation of each image is performed by a convolutional neural network.

3. The non-transitory computer readable medium of claim 1, wherein the truncating of the output high-dimension first representation from the Principal Component Analysis includes retaining at least the first 20 bits from the output high-dimension first representation from the Principal Component Analysis as the reduced-dimension second representation.

4. The non-transitory computer readable medium of claim 1, wherein the truncating of the output high-dimension first representation from the Principal Component Analysis includes retaining at least the first 32 bits from the output high-dimension first representation from the Principal Component Analysis as the reduced-dimension second representation.

5. The non-transitory computer readable medium of claim 1, wherein the truncating of the output high-dimension first representation from the Principal Component Analysis includes retaining at least the first 44 bits from the output high-dimension first representation from the Principal Component Analysis as the reduced-dimension second representation.

6. A method comprising:
    analyzing a collection of images to generate a high-dimension first representation of each image in a collection of images;
    reducing the dimensionality of the high-dimension first representation of each image by:
        identifying significant features from the high-dimension first representation;
        performing a Principal Component Analysis on the high-dimension first representation for each image;
        truncating an output from the Principal Component Analysis;
        converting the output from the Principal Component Analysis to a binary representation to yield a reduced-dimension second representation, wherein any positive value in the output from the Principal Component Analysis is represented as a one and any negative value in the output from the Principal Component Analysis is represented as a zero; and
    comparing the reduced-dimension second representation of any image in the collection of images to the reduced-dimension second representation of any other image in the collection of images, wherein images having identical second representations are duplicates.

7. The method of claim 6, wherein the analyzing of the collection of images to generate a high-dimension first representation of each image is performed by a convolutional neural network.

8. The method of claim 6, wherein the truncating of the output high-dimension first representation from the Principal Component Analysis further comprises retaining at least the first 20 bits from the output high-dimension first representation from the Principal Component Analysis as the reduced-dimension second representation.

9. The method of claim 6, wherein the truncating of the output high-dimension first representation from the Principal Component Analysis further comprises retaining at least the first 32 bits from the output high-dimension first representation from the Principal Component Analysis as the reduced-dimension second representation.

10. The method of claim 6, wherein the truncating of the output high-dimension first representation from the Principal Component Analysis further comprises retaining at least the first 44 bits from the output high-dimension first representation from the Principal Component Analysis as the reduced-dimension second representation.

11. A system comprising:
one or more processors; and
at least one computer-readable storage medium having stored therein instructions which, when executed by the one or more processors, cause the one or more processors to perform operations comprising:
analyzing a collection of images to generate a high-dimension first representation of each image in a collection of images;
reducing the dimensionality of the high-dimension first representation of each image by:
identifying significant features from the high-dimension first representation;
performing a Principal Component Analysis on the high-dimension first representation for each image;
truncating an output from the Principal Component Analysis;
converting the output from the Principal Component Analysis to a binary representation, wherein any positive value in the output from the Principal Component Analysis is represented as a one and any negative value in the output representation from the Principal Component Analysis is represented as a zero; and
comparing the reduced-dimension second representation of any image in the collection of images to the reduced-dimension second representation of any other image in the collection of images, wherein images having identical second representations are duplicates.

12. The system of claim 11, wherein the truncating of the output high-dimension first representation from the Principal Component Analysis further comprises retaining at least the first 20 bits from the output high-dimension first representation from the Principal Component Analysis as the reduced-dimension second representation.

13. The system of claim 11, wherein the truncating of the output high-dimension first representation from the Principal Component Analysis further comprises retaining at least the first 32 bits from the output high-dimension first representation from the Principal Component Analysis as the reduced-dimension second representation.

14. The system of claim 11, wherein the truncating of the output high-dimension first representation from the Principal Component Analysis further comprises retaining at least the first 44 bits from the output high-dimension first representation from the Principal Component Analysis as the reduced-dimension second representation.

* * * * *